United States Patent
Adkins et al.

(10) Patent No.: US 9,959,493 B2
(45) Date of Patent: *May 1, 2018

(54) SYSTEMS AND METHODS FOR AUTHENTICATION OF PRINTER SUPPLY ITEMS

(71) Applicant: Lexmark International, Inc., Lexington, KY (US)

(72) Inventors: Christopher Alan Adkins, Lexington, KY (US); James Ronald Booth, Nicholasville, KY (US); Matthew David Clarke, Lexington, KY (US); Graydon Randall Dodson, Lexington, KY (US); Joshua Scott Potter, Harold, KY (US)

(73) Assignee: Lexmark international Inc., Lexington, KY (US)

( * ) Notice: Subject to any disclaimer, the term of this patent is extended or adjusted under 35 U.S.C. 154(b) by 228 days.

This patent is subject to a terminal disclaimer.

(21) Appl. No.: 15/064,393

(22) Filed: Mar. 8, 2016

(65) Prior Publication Data

US 2017/0163641 A1 Jun. 8, 2017

Related U.S. Application Data

(63) Continuation-in-part of application No. 14/961,416, filed on Dec. 7, 2015.

(51) Int. Cl.
*H04L 29/06* (2006.01)
*G06K 15/00* (2006.01)
*G06F 21/44* (2013.01)

(52) U.S. Cl.
CPC .......... *G06K 15/407* (2013.01); *G06F 21/44* (2013.01)

(58) Field of Classification Search
CPC .................................................. H04L 63/0876
USPC ............................................................ 726/7
See application file for complete search history.

(56) References Cited

U.S. PATENT DOCUMENTS

2012/0187185 A1* 7/2012 Sayan ................ G06Q 30/0601
235/375

OTHER PUBLICATIONS

Mockapetris, "Domain Names—Concepts and Facilities", RFC1034, 1987, Internet Society (ISOC).

(Continued)

*Primary Examiner* — Longbit Chai

(57) ABSTRACT

Methods for authenticating printer supply items using revocation lists are disclosed. Revocation lists are updated using DNSSEC to communicate between a printer and a DNS name server. A first domain name is created containing a request for a challenge to an authentication module and sent to the DNS name server. A second domain name is created containing a response to the challenge and sent to the DNS name server. The DNS name server indicates success or failure, which is used to authenticate the printer supply item. Other systems and methods are disclosed.

12 Claims, 5 Drawing Sheets

(56) References Cited

OTHER PUBLICATIONS

Mockapetris, "Domain Names—Implementation and Specification", RFC1035, 1987, Internet Society (ISOC).
Arends, "DNS Security Introduction and Requirements", RFC4033, 2005, Internet Society (ISOC).
Krawczyk, "HMAC: Keyed-Hashing for Message Authentication", RFC2104,1997, Internet Society (ISOC).
Levine, "DNS Blacklists and Whitelists", RFC5782, 2010, Internet Society (ISOC).
Gieben, "Chain of Trust", master thesis, 2001, Stichting NLnet Labs.
Author Unknown, "The Internet of things runs on .CA", Internet blog, 2015, .CA Labs, Canada.

* cited by examiner

SYSTEMS AND METHODS FOR AUTHENTICATION OF PRINTER SUPPLY ITEMS

CROSS REFERENCES TO RELATED APPLICATIONS

This application is a continuation-in-part of and claims priority to U.S. patent application Ser. No. 14/961,416, filed Dec. 7, 2015 entitled, "Systems and Methods for Authentication of Printer Supply Items" the disclosure of which is incorporated by reference herein in its entirety.

BACKGROUND

1. Field of the Disclosure

The present disclosure relates generally to authentication of printer supply items and more particularly to updating a revocation list using an Internet name server.

2. Description of the Related Art

Printers use consumables such as toner cartridges, fusers, etc. These consumables are often counterfeited and sold to unsuspecting consumers. Counterfeit supplies do not conform to the printer manufacturer's requirements and may damage the customer's printers. To deter counterfeiters, printer manufacturers incorporate authentication modules into the consumables. Printers verify the authenticity of consumables by communicating with the authentication modules. Thus, to counterfeit a consumable a counterfeiter must also counterfeit the associated authentication module. Authentication modules contain, for example, authentication ASICs that are difficult to counterfeit.

However, a determined counterfeiter may duplicate authentication ASICs. The duplicates may be identical and thus have the same internal serial number. Printers may be fooled by the duplicated authentication ASICs enabling counterfeiters to sell counterfeit printer supply items. Eventually, the printer manufacturer discovers the counterfeit printer supply items, analyzes the duplicated authentication ASICs, and adds the duplicated serial number to a revocation list of revoked serial numbers. This revocation list is used by printers to detect duplicated authentication ASICs and to alert users that their printer supply item is a counterfeit. Of course, the counterfeiters are free to duplicate another authentication ASIC which will work in the printers until the new serial number is also added to the revocation list. Thus, it is crucial to quickly update the printer's revocation list as new duplicated authentication ASIC serial numbers are discovered to minimize the number of counterfeit consumables.

The revocation list may be updated by updating the printer firmware. This is difficult to do in the field because firmware files are large and sending firmware updates places a burden on customer networks. Also, many customers have network firewalls that prevent a printer from connecting to an update server located outside the firewall using network file transfer protocols such as FTP. Thus, once a printer is installed it may never receive updated firmware. An updated revocation list may be written to a printer supply item's authentication module during manufacturing and the updated revocation list may be transferred to a printer when the printer supply item is installed into the printer. In this way, the printer's revocation list may be updated while the printer is in the field. However, it may take many months for an updated revocation list to be seen by all printers in the field since existing inventory of older consumables must be used up before the newer consumables make it to the printers. During that delay, many counterfeit consumables may reach the market. Also, if a printer is only given counterfeit supplies it will never receive an updated revocation list. What is needed is a method to more quickly update revocation lists of printers in the field that works through firewalls.

SUMMARY

The invention, in one form thereof, is directed to a method of verifying the authenticity of a toner cartridge of an imaging device having a cartridge serial number. The method includes establishing a chain of trust from an Internet root name server to a rights management name server (RM name server) using Domain Name System Security Extensions (DNSSEC); sending a first domain name to the RM name server that includes a request for a challenge; receiving a first response from the RM name server that contains a first IP address; determining whether the first IP address is within a first set of IP addresses; and upon a positive determination adding the cartridge serial number to a revocation list and displaying a first error on a display.

The invention, in another form thereof, is directed to a method of operating an imaging device to verify the authenticity of a toner cartridge having an authentication ASIC having an identification string. The method includes sending a first domain name to a RM name server that includes a request for a challenge and the identification string; receiving a first response from the RM name server that contains a first IP address; determining whether the first IP address is an odd address; and upon a positive determination displaying a first error on a display located on the imaging device.

The invention, in yet another form thereof, is directed to a method of operating an imaging device to verify the authenticity of a toner cartridge having a serial number. The method includes sending a first domain name to a RM name server and in response receiving a first IP address from the RM name server, sending a second domain name to the RM name server and in response receiving a second IP address from the RM name server; determining whether the first IP address is even and the second IP address is 0.0.0.0; upon a positive determination, printing using toner from the toner cartridge; and upon a negative determination displaying an error on a display located on the imaging device. The first domain name contains the serial number and the second domain name contains a response generated by an authentication ASIC based on the first IP address.

BRIEF DESCRIPTION OF THE DRAWINGS

The accompanying drawings incorporated in and forming a part of the specification, illustrate several aspects of the present disclosure, and together with the description serve to explain the principles of the present disclosure.

FIG. 4, shows a flowchart of a method according to one example embodiment.

DETAILED DESCRIPTION

In the following description, reference is made to the accompanying drawings where like numerals represent like elements. The embodiments are described in sufficient detail to enable those skilled in the art to practice the present disclosure. It is to be understood that other embodiments may be utilized and that process, electrical, and mechanical changes, etc., may be made without departing from the scope of the present disclosure. Examples merely typify possible variations. Portions and features of some embodiments may be included in or substituted for those of others. The following description, therefore, is not to be taken in a limiting sense and the scope of the present disclosure is defined only by the appended claims and their equivalents.

Figure 1:
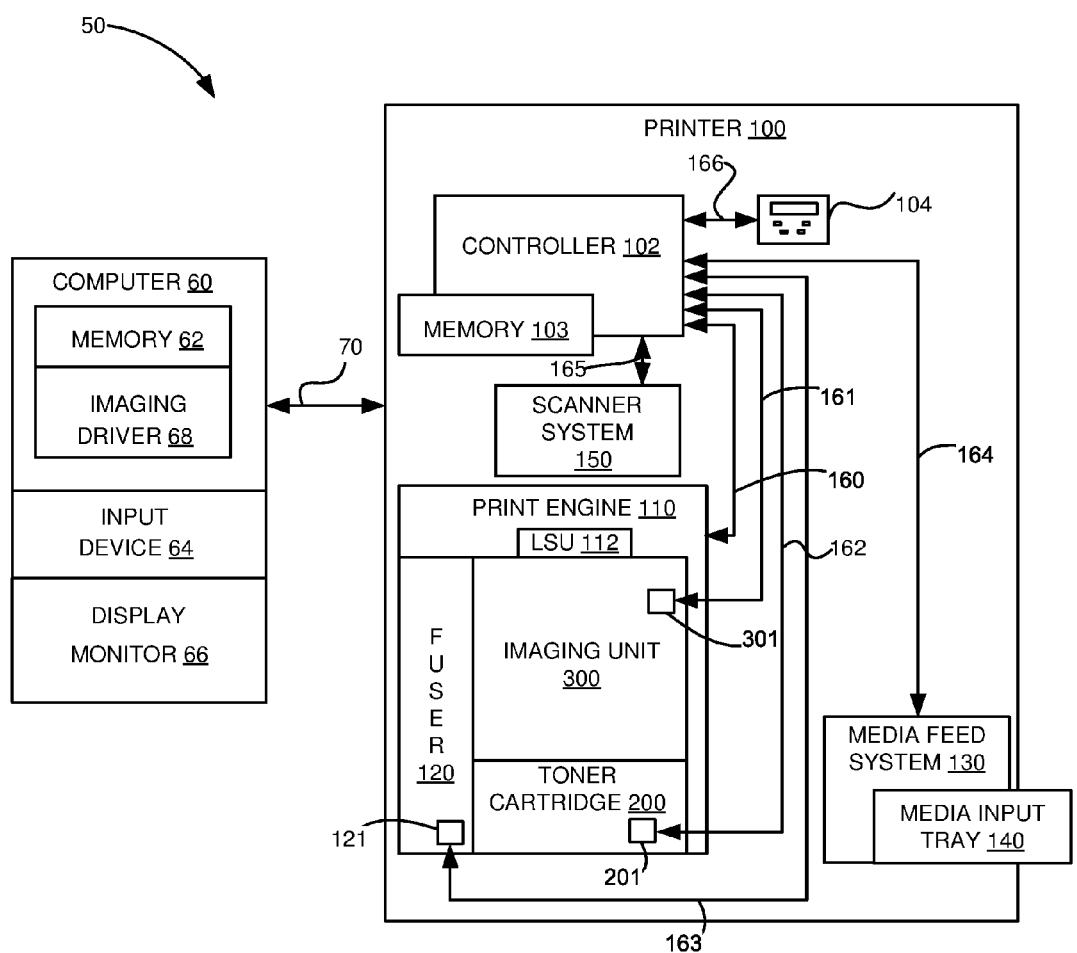
FIG. 1 is a block diagram of an imaging system including a printer according to one example embodiment.

Referring to the drawings and particularly to FIG. 1, there is shown a block diagram depiction of an imaging system 50 according to one example embodiment. Imaging system 50 includes a printer 100 and a computer 60. Printer 100 communicates with computer 60 via a communications link 70. As used herein, the term "communications link" generally refers to any structure that facilitates electronic communication between multiple components and may operate using wired or wireless technology e.g. I2C, USB, Ethernet, Wi-Fi, 4G, etc.

In the example embodiment shown in FIG. 1, printer 100 is a multifunction device (sometimes referred to as an all-in-one (AIO) device) that includes a controller 102, a user interface 104, a print engine 110, a laser scan unit (LSU) 112, one or more toner cartridges or cartridges 200, one or more imaging units 300, a fuser 120, a media feed system 130 and media input tray 140, and a scanner system 150. Printer 100 may communicate with computer 60 via a standard communication protocol, such as, for example, universal serial bus (USB), Ethernet or IEEE 802.xx. Printer 100 may be, for example, an electrophotographic printer/copier including an integrated scanner system 150 or a standalone electrophotographic printer.

Controller 102 includes a processor unit and associated memory 103 and may be formed as one or more Application Specific Integrated Circuits (ASICs). Memory 103 may be any volatile or non-volatile memory or combination thereof such as, for example, random access memory (RAM), read only memory (ROM), flash memory and/or non-volatile memory (NVRAM). Alternatively, memory 103 may be in the form of a separate electronic memory (e.g., RAM, ROM, and/or NVRAM), a hard drive, a CD or DVD drive, or any memory device convenient for use with controller 102. Controller 102 may be, for example, a combined printer and scanner controller.

In the example embodiment illustrated, controller 102 communicates with print engine 110 via a communications link 160. Controller 102 communicates with imaging unit(s) 300 and processing circuitry 301 on each imaging unit 300 via communications link(s) 161. Controller 102 communicates with toner cartridge(s) 200 and processing circuitry 201 on each toner cartridge 200 via communications link(s) 162. Controller 102 communicates with fuser 120 and processing circuitry 121 thereon via a communications link 163. Controller 102 communicates with media feed system 130 via a communications link 164. Controller 102 communicates with scanner system 150 via a communications link 165. User interface 104 is communicatively coupled to controller 102 via a communications link 166. Processing circuitry 121, 201, 301 may include a processor and associated memory such as RAM, ROM, and/or NVRAM and may provide authentication functions, safety and operational interlocks, operating parameters and usage information related to fuser 120, toner to cartridge(s) 200 and imaging unit(s) 300, respectively. Controller 102 processes print and scan data and operates print engine 110 during printing and scanner system 150 during scanning.

Computer 60, which is optional, may be, for example, a personal computer, including memory 62, such as RAM, ROM, and/or NVRAM, an input device 64, such as a keyboard and/or a mouse, and a display monitor 66. Computer 60 also includes a processor, input/output (I/O) interfaces, and may include at least one mass data storage device, such as a hard drive, a CD-ROM and/or a DVD unit (not shown). Computer 60 may also be a device capable of communicating with printer 100 other than a personal computer such as, for example, a tablet computer, a smartphone, or other electronic device.

In the example embodiment illustrated, computer 60 includes in its memory a software program including program instructions that function as an imaging driver 68, e.g., printer/scanner driver software, for printer 100. Imaging driver 68 is in communication with controller 102 of printer 100 via communications link 70. Imaging driver 68 facilitates communication between printer 100 and computer 60. One aspect of imaging driver 68 may be, for example, to provide formatted print data to printer 100, and more particularly to print engine 110, to print an image. Another aspect of imaging driver 68 may be, for example, to facilitate the collection of scanned data from scanner system 150.

In some circumstances, it may be desirable to operate printer 100 in a standalone mode. In the standalone mode, printer 100 is capable of functioning without computer 60. Accordingly, all or a portion of imaging driver 68, or a similar driver, may be located in controller 102 of printer 100 so as to accommodate printing and/or scanning functionality when operating in the standalone mode.

Figure 2:
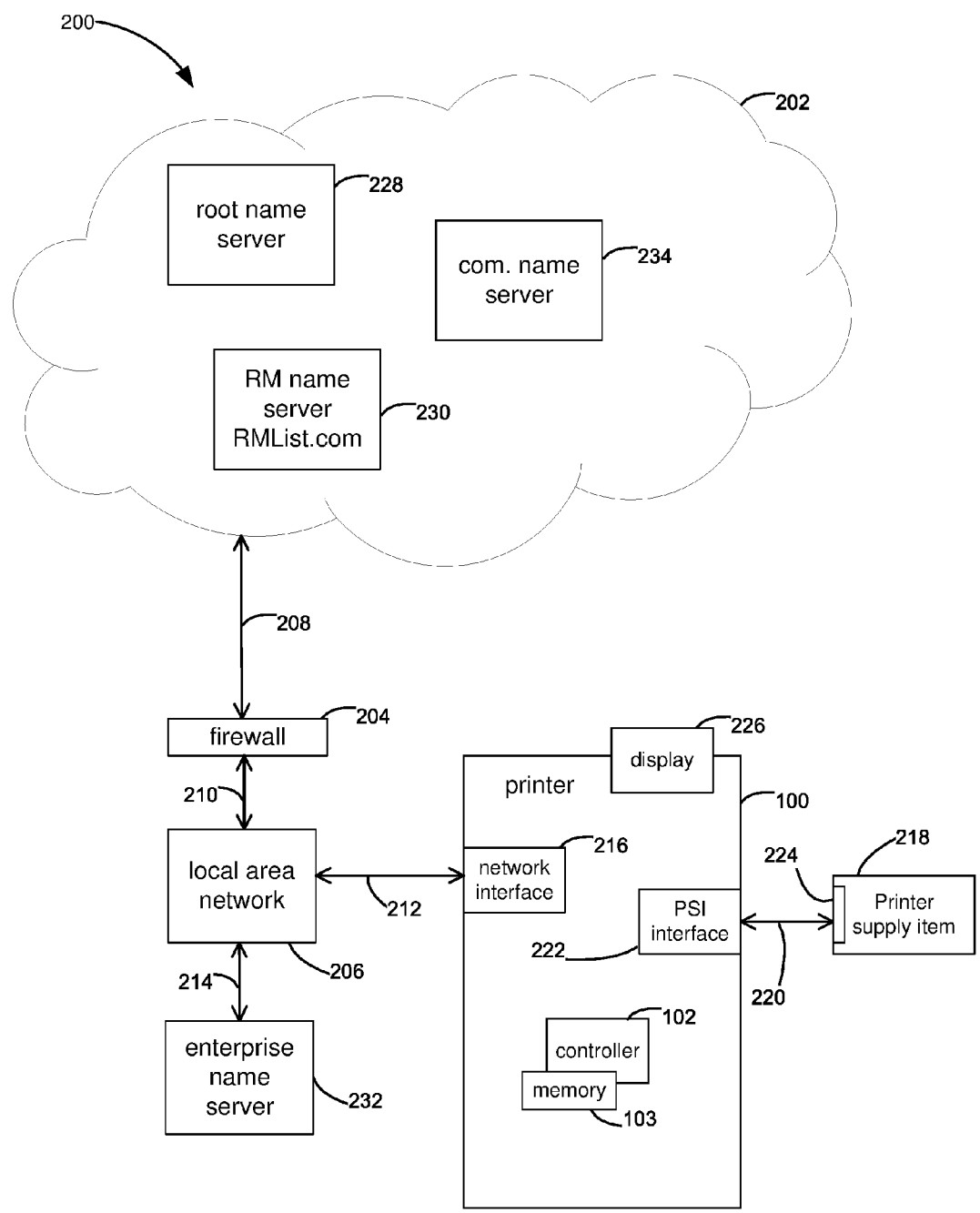
FIG. 2 is a block diagram of a communication system according to one example embodiment.

FIG. 2 shows a communication system 200. The printer 100 is connected to the Internet 202 through a firewall 204 using a local area network (LAN) 206. Alternate embodiments may omit the firewall 204, or have a trusted external name server outside the firewall. Communications links 208, 210, 212, 214 connect components of the communication system 200. The printer 100 has a network interface 216 that connects the printer 100 to the LAN 206 via communications link 212. The printer 100 is connected to a printer supply item (PSI) 218 through a communications link 220 through a PSI interface 222. In this example, the PSI 218 is a toner cartridge containing an authentication module 224, the PSI interface 222 is an I2C interface, and the communications link 220 contains an I2C clock wire and an I2C data wire.

When the controller 102 detects a new PSI 218 the controller 102 reads a PSI serial number from the authentication module 224 and checks for it on a revocation list located in the controller's memory 103. The revocation list may be located in non-volatile memory. If the PSI serial number is on the revocation list the printer displays an alert on a display 226. Display 226 may be part of user interface 104. The alert may contain text alerting a user that the PSI 218 is counterfeit if, for example, the display 226 is capable of displaying text e.g. if the display is a graphic display. The alert may include lighting one or more LEDs if the display 226 lacks the capacity to display text. The printer may enter an error state and prohibit printing until the counterfeit PSI 218 is replaced with a genuine PSI. In this way, a customer is saved from the risk of damage due to the counterfeit PSI.

If the PSI serial number is not on the revocation list, the controller 102 updates the revocation list and then checks for the PSI serial number on the updated revocation list. To update the revocation list, the controller 102 first establishes a chain of trust from an Internet root name server 228 to a rights management name server (RM name server) 230 using Domain Name System Security Extensions (DNSSEC). DNSSEC is described in Network Working Group RFC4033 (March 2005). To establish the chain of trust, the controller 102 asks an enterprise name server 232 for the root name server 228 DNS keys and for the root name server's secure delegation to com. name server 234. The enterprise name server 232 may need to communicate to other name servers if the answer is not cached. Those name servers may be outside the firewall 204. Root's keys and delegation data are returned, and the controller 102 verifies the delegation data using root's keys. Next, the controller 102 asks the enterprise name server 232 for com. name server 234 DNS keys and secure delegation to RM name server 230 for RMList.com. Com.'s keys and delegation data are returned and verified by the controller 102. Next, the controller 102 asks the enterprise name server 232 for RMList.com's DNS keys. A public key is returned from the RM name server 230. The controller 102 verifies the public key. If all answers cryptographically verify, the controller 102 now has a trusted public key for RMList.com.

Now that the chain of trust has been established, the controller 102 asks enterprise name server 232 for the IP address of a domain name containing a request for a challenge (RFC) for the authentication module 224. The authentication module 224 implements cryptographic functions that return a response when presented with a challenge. The requested information is unlikely to be cached by the enterprise name server 232 so the request is eventually passed to RM name server 230. RM name server 230 parses the domain name, determines that it is a RFC, and returns a challenge that is appropriate for the authentication ASIC. The returned challenge is in the form of an IP address e.g. a IPv4 32-bit number, a IPv6 128-bit number, etc. The controller 102 sends the challenge to the authentication module 224 that sends a response back to the controller 102. The controller 102 asks enterprise name server 232 for the IP address of a domain name containing the response to challenge (RTC) that is passed to the RM name server 230. The RM name server 230 checks if the response is valid and if it is valid the RM name server 230 sends the IP address 0.0.0.0 signaling that the PSI 218 is authentic. If the response is not valid the RM name server sends the IP address 1.1.1.1 signifying that the PSI 218 is not authentic. Once the PSI 218 is determined to be authentic the printer 100 may print using toner from the PSI 218.

If the DNS query for the DNSSEC records fails, or if the address query fails, it is preferable for the controller 102 to treat the PSI as authentic. Thus, if there is a problem with a network connection the printer will still operate. The controller 102 may periodically retry the failed query until it is successful. Each retry may occur after a random delay to make it more difficult for a counterfeiter to disrupt the query.

This process for managing the printer's revocation list has many advantages. It uses the DNSSEC protocol which is not blocked by most firewalls. Thus, it may work in installations that block FTP or HTTPS. The process is very fast and may take as little as one second to complete. This is important since it is preferable to alert the user that the PSI is counterfeit while the user is still standing at the printer so they know to replace the PSI with a genuine PSI. The process is secure since it relies on the DNSSEC chain of trust and thus is resistant to a man-in-the-middle attack. Only small data packets are sent which will not burden a customer's network. The data packets are simple and easy for a customer to understand which makes the process transparent.

An example RFC subdomain may contain the following fields: preamble text string, cartridge serial number, Network Printing Alliance (NPA) family ID, digest of device serial number, message authentication code, and domain name of the RM name server. The fields may be separated by a delimiting character e.g. "-". The preamble text may be one character e.g. "C" indicating a challenge request. The cartridge serial number may be twelve characters e.g. "CAA120090822". The NPA family ID may be two characters e.g. "A3" indicating which of several challenge/response methods to use to select a challenge. The NPA family ID is an indicia indicating one of a plurality of types of challenges. The RM name server may be configured to provide challenges for multiple types of authentication modules, which require different challenges and respond with different responses. The digest of device serial number, e.g. sixteen characters, may be used to anonymously identify the printer 100 reporting the cartridge install. The device serial number is hashed so the identify of the customer who owns the printer 100 is not revealed. Due to space constraints in the domain name, only the most significant eighty bits of the SHA256 hash are used. Preferably, the 80-bit number is expressed as the extended hex encoding (base32) of the 80-bit number resulting in sixteen characters. The message authentication code may be the most significant 120 bits of a HMAC-SHA256 using a shared secret key that covers the full preceding character string expressed as the extended hex encoding (base32) of the 120-bit number resulting in twenty four characters. An example RFC subdomain is C-CAA120090822-A3-K721IRIG9ERULNPT-LU4EMR6-MR6M8A3VDCPJO4J58RNM.COUNTERFEITLIST.COM.

An example RTC subdomain may contain the following fields: preamble text string, cartridge serial number, NPA family ID, challenge value, response value, message authentication code, and domain name of the RM name server. The fields may be separated by a delimiting character e.g. "-". The preamble text may be one character e.g. "R". The cartridge serial number, NPA family ID, and message authentication code have the same format as the RFC subdomain. The challenge value may be eight characters corresponding to a 32-bit value returned by the RM name server from a prior RFC. The response value may be eight characters corresponding to a 32-bit value returned by the authentication module 224. An example RTC subdomain is R-CAA120090822-A3-0B648BA0-0AB462C0-OUV1T-VFL97EG6C4AP99HURJH.COUNTERFEITLIST.COM.

Extend hex coding uses the character "=" to pad values that are not integer multiples of five bits. Note that the character "=" is not valid in a domain name and so all values encoded using Extended Hex coding must be integer multiples of five bits.

Figure 3:
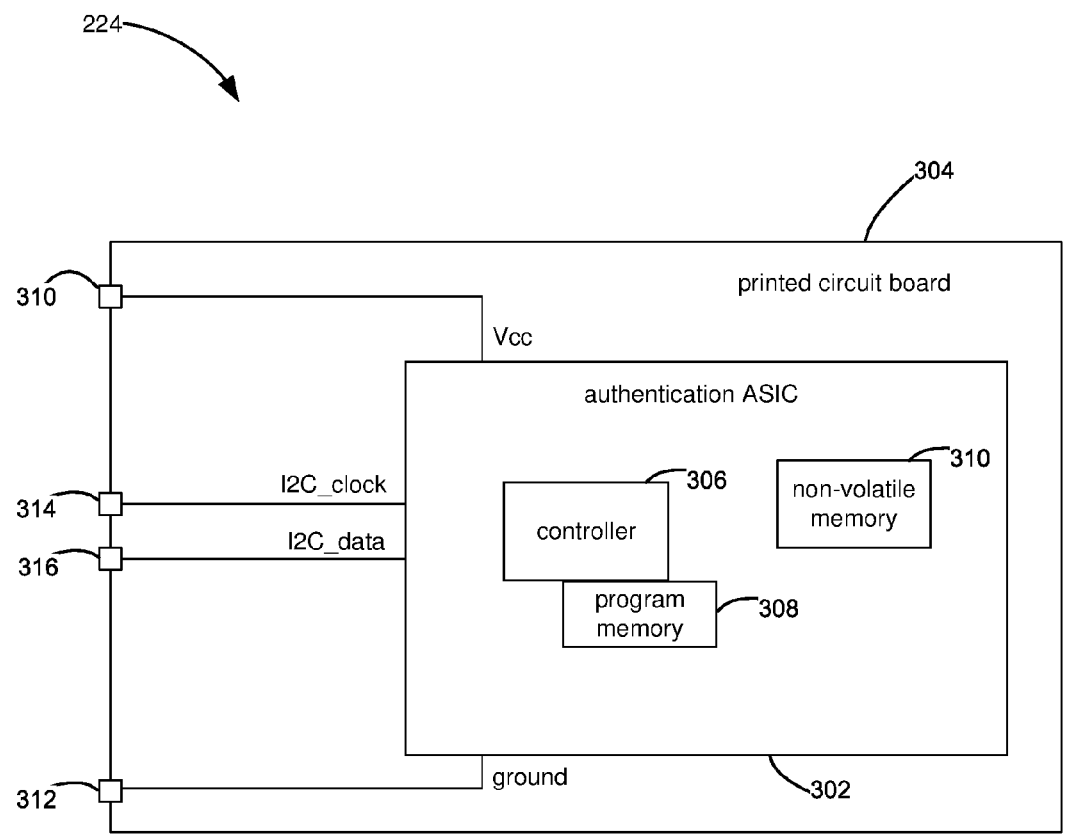
FIG. 3 is a schematic diagram of an authentication module according to one example embodiment.

FIG. 3 shows the authentication module 224 having an authentication ASIC 302 mounted to a printed circuit board (PCB) 304. The authentication module 224 is configured to facilitate authentication of a PSI. For example, the authentication ASIC 302 may perform cryptographic functions in response to requests by the printer 100 using cryptographic keys located in the authentication ASIC 302. The authentication ASIC 302 has a controller 306 configured to execute program instructions located in program memory 308. The program memory 308 is part of the controller 306 and may contain volatile memory, non-volatile memory, or a combination of volatile memory and non-volatile memory. The controller 306 may contain a central processing unit (CPU) for executing program instructions. Alternatively, the controller 306 may contain application specific circuits that do not execute program instructions. These application specific circuits may be in, for example, a field programmable gate array (FPGA). The authentication ASIC 302 also has non-volatile memory 310 that contains one or more non-volatile storage technologies e.g. EEPROM, ROM, FLASH, etc. Non-volatile memory 310 may be located contiguously within the authentication ASIC 302. Alternatively, non-volatile memory 310 may be segmented into discrete segments. Non-volatile memory 310 may be located in a separate IC package mounted to the printed circuit board 304. The PCB 304 has a power connection 310, a ground connection 312, an I2C clock connection 314, and an I2C data connection 316 for interfacing to the printer 100.

Figure 4A:
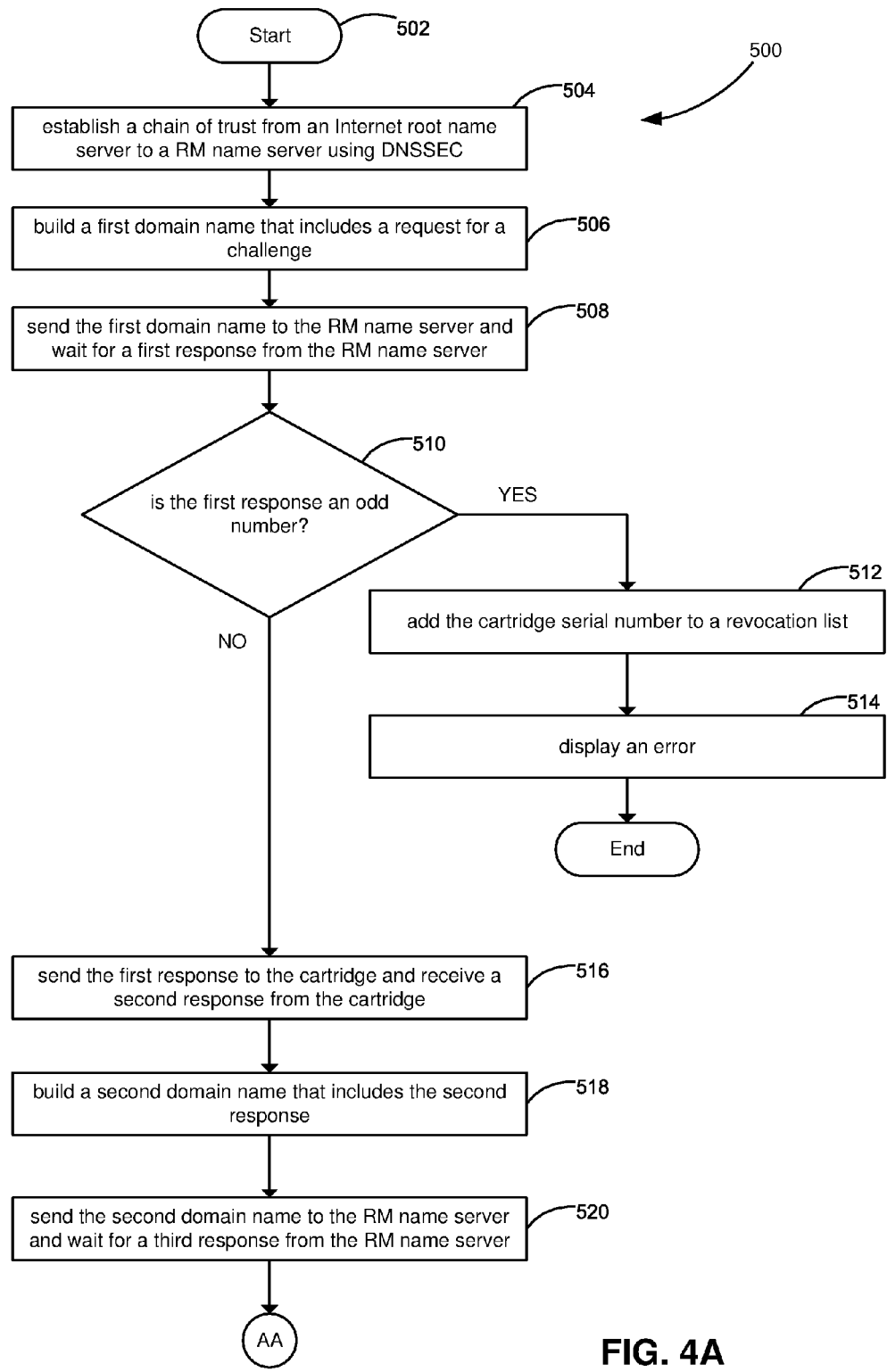
FIG. 4A and FIG. 4B, together forming
Figure 4B:
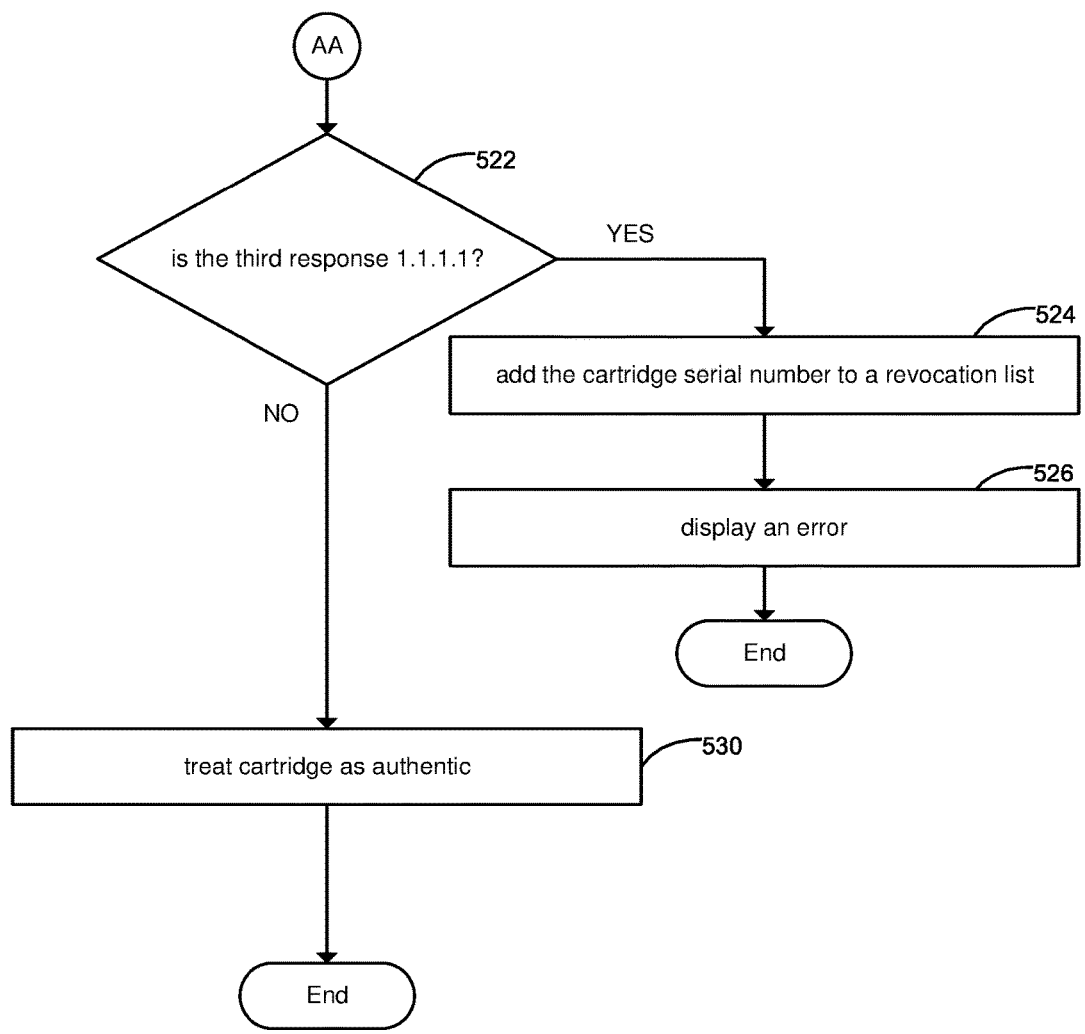

FIG. 4a and FIG. 4b together form FIG. 4 which shows a method 500 of verifying the authenticity of a toner cartridge of an imaging device. The method 500 quickly updates revocation lists of printers in the field and works through firewalls. The method may be implemented by the controller 102 in a printer 100.

At block 502, the method starts. At block 504, a chain of trust is established from an Internet root name server to a RM name server using DNSSEC as disclosed above. At block 506, a first domain name is built that includes a request for a challenge as disclosed above. At block 508, the first domain name is sent to the RM name server. The controller 102 waits for a first response from the RM name server. The first response contains a first IP address. For example, the first response may be a DNS A record.

At block 510, the controller 102 determines whether the first IP address is within a first set of IP addresses. The first set of IP addresses may be, for example, the set of all odd numbered addresses. Alternatively, the first set of IP addresses may be the set of all even numbered addresses, all addresses that start with the number eight, etc. Upon a positive determination, at block 512 the cartridge serial number is added to a revocation list. The revocation list may be stored in the printer 100, in the authentication module 224, etc. At block 514, an error is displayed on a display such as, for example, display 226.

Upon a negative determination, at block 516 the first IP address is sent to the authentication module 224 located on the PSI 218. The authentication module 224 interprets the first IP address as a challenge and performs cryptographic algorithms using the challenge to generate a second response. The authentication module 224 sends the second response to the controller 102. At block 518, a second domain name is built that includes the second response. The second domain name includes a response to challenge as disclosed above. At block 520 the second domain name is sent to the RM name server. The controller 102 waits for a third response from the RM name server. The third response contains a second IP address. For example, the third response may be a DNS A record.

At block 522, the controller 102 determines whether the second IP address is within a second set of IP addresses. The second set of IP addresses may be, for example, a set that contains 1.1.1.1. Alternatively, the second set of IP addresses may be the set of all even numbered addresses, all odd numbered addresses, etc. Upon a positive determination, at block 524 the cartridge serial number is added to the revocation list. At block 526, an error is displayed on the display.

Upon a negative determination, at block 530 the PSI 218 is treated as authentic. If, for example, the PSI 218 is a toner cartridge, this may include printing using toner from the toner cartridge.

The method 500 is useful, for example, to verify the authenticity of an authentication module that uses a physical unclonable function (PUF) in its cryptography algorithm. A PUF, such a sequence of gates with a propagation delay that is stable in an individual module but varies randomly from module to module, is difficult to clone. During manufacturing, each authentication module is given a series of challenges and the resulting responses are stored with the challenges in, for example, a RM name server indexed by the authentication module's serial number. To verify an individual module in a printer, a RFC that contains the module's serial number is sent to the RM name server. The RM name server retrieves a stored challenge that corresponds to this module and sends it to the printer. The printer sends the challenge to the authentication module, which uses its PUF to generate a response. The response is included in a RTC that is sent to the RM name server. The RM name server compares the response to the stored response that corresponds to this module and sends a success/fail to the printer. In this way, an authentication module that uses a PUF may be validated.

The foregoing description illustrates various aspects and examples of the present disclosure. It is not intended to be exhaustive. Rather, it is chosen to illustrate the principles of the present disclosure and its practical application to enable one of ordinary skill in the art to utilize the present disclosure, including its various modifications that naturally follow. For example, method acts may be performed in alternate orders. An authentication module may be a PCB containing one or more authentication circuits, an authentication ASIC, etc. All modifications and variations are contemplated within the scope of the present disclosure as determined by the appended claims. Relatively apparent modifications include combining one or more features of various embodiments with features of other embodiments.

What is claimed is:

1. A method of verifying the authenticity of a toner cartridge of an imaging device having a cartridge serial number, the method comprising:
   establishing a chain of trust from an Internet root name server to a rights management name server (RM name server) using Domain Name System Security Extensions (DNSSEC);
   sending from the imaging device a first domain name to the RM name server that includes a request for a challenge associated with the cartridge serial number;
   receiving a first response From the RM name server that contains a token with a format of a first IP address;
   determining by the imaging device whether the received first IP address is within a first set of IP addresses; and
   upon a positive determination adding the cartridge serial number to a revocation list and displaying a first error on a display of the imaging device.

2. The method of claim 1, wherein the first set of IP addresses contains only odd addresses.

3. The method of claim 2, wherein the second set of IP addresses contains 1.1.1.1.

4. The method of claim 2, wherein the request for a challenge includes an indicia indicating one of a plurality of types of challenges.

5. The method of claim 4, wherein the second domain name includes the indicia.

6. The method of claim 1, further comprising upon a negative determination sending the first IP address to the toner cartridge, receiving a second response from the toner cartridge, sending a second domain name to the RM name server that includes the second response, receiving a third response from the RM name server that contains a second IP address, determining whether the second Ip address is within a second set of IP addresses, upon a positive determination adding the cartridge serial number to the revocation list and displaying a second error on the display, and upon a negative determination treating the toner cartridge as authentic.

7. The method of claim 1, wherein treating the toner cartridge as authentic includes printing using toner from the toner cartridge.

8. A method of operating an imaging device to verify the authenticity of a toner cartridge containing an authentication ASIC (application-specific integrated circuit) having an identification string, the method comprising:
sending from the imaging device a first domain name to a rights management name server (RM name server) that includes a request for a challenge and the identification string included in the authentication ASIC;
receiving a first response from the RM name server that contains a token with a format of a first IP address;
determining by the imaging device whether the received first IP address is an odd address; and
upon a positive determination displaying a first error on a display located on the imaging device of the imaging device.

9. The method of claim 8, further comprising upon a negative determination sending the first IP address to the authentication ASIC, receiving a second response from the authentication ASIC, sending a second domain name to the RM name server that includes the second response, receiving a third response from the RM name server that contains a second IP address, determining whether the second IP address is 1.1.1.1, upon a positive determination displaying a second error on the display, and upon a negative determination printing using toner from the toner cartridge.

10. The method of claim 9, wherein the request for a challenge includes an indicia indicating one of a plurality of types of challenges.

11. The method of claim 9, wherein the second domain name includes the indicia.

12. A method of operating an imaging device to verify the authenticity of a toner cartridge containing an authentication ASIC (application-specific integrated circuit) having a serial number comprising:
sending from the imaging device a first domain name containing the cartridge serial number to a rights management name server (RM name server) and in response receiving a token with a format of a first IP address from the RM name server;
sending a second domain name to the RM name server and in response receiving a token with the format of a second IP address from the RM name server, wherein the second domain name contains a response generated by the authentication ASIC based on the received first IP address;
determining by the imaging device whether the received first IP address is even and the received second IP address is 0.0.0.0;
upon a positive determination, printing using toner from the toner cartridge; and
upon a negative determination displaying an error on a display located on the imaging device.

* * * * *